March 7, 1939.    R. CLOW    2,149,910
CULINARY IMPLEMENT
Filed Oct. 25, 1938
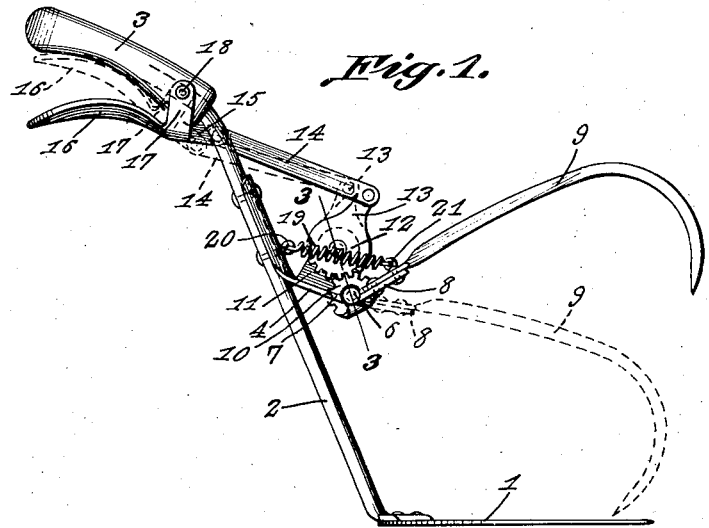
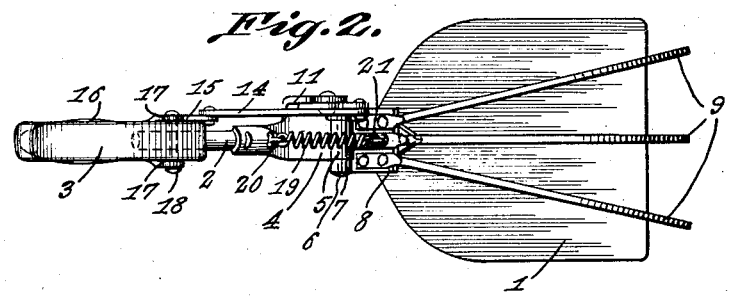
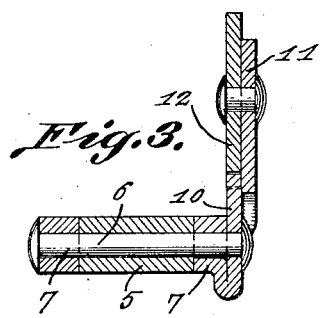
Roy Clow, INVENTOR
BY Victor J. Evans & Co.
ATTORNEYS Patented Mar. 7, 1939

2,149,910

UNITED STATES PATENT OFFICE 2,149,910

CULINARY IMPLEMENT

Roy Clow, Ann Arbor, Mich.

Application October 25, 1938, Serial No. 236,954

3 Claims. (Cl. 294—104)

This invention relates to culinary implements, and its general object is to provide a device of that character which is primarily designed for handling and especially for removing hot or bulky foods from cooking utensils, without possibility of casual removal of the food from the device or burning the user, in that the device includes food supporting and penetrating means arranged for cooperative association, the supporting means acting as a scoop and being adapted for disposal under the food to receive the latter thereon and the penetrating means for grasping and holding the food against removal therefrom, and the penetrating means is mounted for movement into and out of operative position for holding and releasing the food at the will of the user.

A further object is to provide a culinary device that can be operated by one hand and is normally maintained with the penetrating means in released position, as well as automatically moved accordingly.

Another object is to provide a culinary device that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of the device which forms the subject matter of the present invention, with the fork or penetrating means in normal or released position in full lines and in operative position in dotted lines.

Figure 2 is a top plan view of the device.

Figure 3 is a sectional view taken approximately on line 3—3 of Figure 1.

Referring to the drawing in detail, the reference numeral 1 indicates the head of my device which acts substantially in the capacity of a scoop as well as supporting means for the food, and is preferably in the form of a flat blade of substantially rectangular formation, as best shown in Figure 2. The head or blade is provided with a reduced rear portion having riveted or otherwise secured thereto, the flattened lower end of a shank 2 that rises at a rearward inclination therefrom, as best shown in Figure 1. The upper end of the shank is curved rearwardly and mounted in the socket of a handle 3.

A bracket 4 having an upper portion transversely curved to follow the like curvature of the shank 2 is seated thereon and is riveted or otherwise secured thereto. From the shank, the bracket extends forwardly at a downward inclination and the inclined portion terminates at its lower end into a sleeve 5 that has disposed therein and extending from opposite ends thereof a headed pivot pin 6.

Mounted on the extending portions of the pin for pivotal movement between the heads thereof and the sleeve are bearing collars 7 formed on the bifurcated rear end of a plate 8 which has mounted or otherwise secured thereto the flattened rear ends of tines 9 providing a fork, as will be apparent. It will be noted that my device in the form as shown includes three tines, one of which extends centrally from the plate and the others upon opposite sides of the central tine in diverging relation with respect to each other from the plate, as clearly shown in Figure 2. The tines have their forward portions curved toward the blade or head 1 in substantially hooked formation and terminate at their outer ends in penetrating points.

Formed on the side edge of the plate 8 and rising therefrom for disposal at right angles with respect thereto, is a substantially disk shaped toothed or gear segment 10, and an upright lug 11 is formed on a corresponding side of the inclined portion of the bracket 4. The lug has pivotally or rockably mounted thereon, a toothed or gear segment 12 having the teeth thereof meshing with the teeth of the segment 10, as best shown in Figure 1.

The toothed segment 12 has a tongue 13 formed on and rising therefrom and to which is pivoted the forward end of a link 14 that has its rear end pivoted to a forwardly extending arm 15 formed on a hand gripping lever 16, the latter being provided with a pair of spaced parallel ears 17 rising therefrom and pivotally mounted on a pin 18 that extends through the handle 3 and the upper end of the shank. By that construction, it will be seen that the handle is not only fixed to the shank in a manner to hold the same against casual removal or displacement with respect thereto, but that the lever is pivotally connected to the handle for movement toward and away from the same. The handle is of elongated formation as shown, and the lever is transversely curved to provide a smooth hand gripping surface, as well as a seat for receiving the handle therein when the latter and the lever are gripped for operating the device as will be apparent, and the handle is preferably reduced on the under surface thereof as shown, to accommodate the lever.

The fork is normally held in raised position, as shown in full lines in Figure 1 by a coil spring 19 that has one end fastened to an eye 20 formed on one of the securing rivets of the bracket 4 and its opposite end is connected to an eye 21 formed on one of the securing rivets for the center line, as best shown in Figure 1.

From the above description and disclosure in the drawing, it will be obvious that when the handle and lever 16 are gripped and the lever moved toward the handle, that the tines are moved from their full line position of Figure 1 to the dotted line position thereof, and when the lever is released, the spring 19 pulls the tines to their normal or raised position, with the result it will be seen that my device is capable of handling foods with minimum effort on the part of the user, and in a manner and for the purpose set forth in the objects, regardless of whether the food be in one piece, as for example a roast of beef or in a mass, such as for instance sauerkraut or the like.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A culinary device comprising a head in the form of a substantially rectangular shaped blade, a shank secured to and rising from said head, a handle on the upper end of said shank, a bracket secured to said shank, a fork including penetrating tines and pivoted to said bracket for cooperation with said head to set up a grasping action, a spring connected to the bracket and fork, a gear segment on the fork, a gear segment on the bracket and the teeth thereof meshing with the teeth of the first segment, hand gripping means pivoted to the handle and linked to the gear segment on the bracket for cooperation with the spring for moving the tines toward and away from the head.

2. A culinary device comprising a head in the form of a substantially rectangular shaped blade, a shank secured to and rising at a rearward inclination therefrom, an elongated handle on the upper end of said shank, a bracket secured to said shank and extending forwardly therefrom, a sleeve on the forward end of said bracket, a pivot pin extending through the sleeve, a fork including a plate and penetrating tines secured to said plate, collars formed on the plate and pivoted on the pin upon opposite sides of the sleeve, a spring connected to the bracket and fork for holding the tines normally away from the head, toothed means mounted on the bracket and fork and cooperating with the spring for moving the tines toward and away from said head, and hand gripping means pivoted to the handle and linked to the toothed means for operating the latter.

3. A culinary device comprising a head in the form of a substantially rectangular shaped blade, a shank secured to said head and rising rearwardly therefrom, an elongated handle on the upper end of said shank, a bracket secured to said shank and extending forwardly therefrom, a fork including penetrating tines and pivotally secured to the forward end of the bracket for cooperation with said head to set up a grasping action, said tines being curved in hook formation toward the head, a coil spring having its ends connected to the bracket and fork respectively for holding the tines normally in raised position away from said head, and means including a hand gripping lever pivoted to the handle for moving said tines against the action of the spring toward said head.

ROY CLOW.